(12) United States Patent
Chen et al.

(10) Patent No.: US 11,226,805 B2
(45) Date of Patent: Jan. 18, 2022

(54) METHOD AND SYSTEM FOR PREDICTING UPGRADE COMPLETION TIMES IN HYPER-CONVERGED INFRASTRUCTURE ENVIRONMENTS

(71) Applicant: Dell Products L.P., Hopkinton, MA (US)

(72) Inventors: Chao Chen, Shanghai (CN); Wen Yu Tang, Shanghai (CN); Xiang Huang, Shanghai (CN); Muzhar S. Khokhar, Shrewsbury, MA (US); Donald Mace, Hopkinton, MA (US); Somchai Pitchayanonnetr, Quincy, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/528,565

(22) Filed: Jul. 31, 2019

(65) Prior Publication Data

US 2021/0034350 A1 Feb. 4, 2021

(51) Int. Cl.

| G06F 9/44 | (2018.01) |
|---|---|
| G06F 8/65 | (2018.01) |
| G06N 5/02 | (2006.01) |
| G06N 20/00 | (2019.01) |

(52) U.S. Cl.
CPC ............... *G06F 8/65* (2013.01); *G06N 5/02* (2013.01); *G06N 20/00* (2019.01)

(58) Field of Classification Search
CPC ............. G06F 8/65; G06N 20/00; G06N 5/02
See application file for complete search history.

(56) References Cited

U.S. PATENT DOCUMENTS

| 6,092,091 A * | 7/2000 | Sumita .................... G06F 16/93 715/209 |
|---|---|---|
| 7,957,330 B1 * | 6/2011 | Bahadur ............... H04L 41/082 370/282 |
| 9,063,818 B1 * | 6/2015 | Risbood .................... G06F 8/61 |
| 10,089,108 B1 * | 10/2018 | Noble ........................ G06F 8/71 |
| 10,650,278 B1 * | 5/2020 | Ho ..................... G06K 9/00201 |
| 2005/0111526 A1 * | 5/2005 | Bilgic .................. H04B 1/7117 375/147 |
| 2006/0130042 A1 * | 6/2006 | Dias ....................... G06F 9/5083 717/168 |
| 2008/0134145 A1 * | 6/2008 | Halcrow ................... G06F 8/65 717/124 |
| 2015/0089399 A1 * | 3/2015 | Megill ............... G06Q 30/0203 715/753 |
| 2015/0212808 A1 * | 7/2015 | Mandava .................. G06F 9/48 717/168 |
| 2018/0145955 A1 * | 5/2018 | Nirwal .................... H04L 63/06 |
| 2019/0303771 A1 * | 10/2019 | Soong ....................... G06N 5/04 |
| 2019/0342182 A1 * | 11/2019 | Dhanabalan .......... H04L 41/147 |
| 2020/0134498 A1 * | 4/2020 | Harry Putra ............. G06N 3/08 |

(Continued)

*Primary Examiner* — Hang Pan
(74) *Attorney, Agent, or Firm* — Chamberlain, Hrdlicka, White, Williams & Aughtry

(57) ABSTRACT

A method and system for predicting upgrade completion times in hyper-converged infrastructure (HCI) environments. Specifically, the method and system disclosed herein entail applying machine learning to forecast these upgrade completion times based on select static and dynamic indicators deduced to significantly impact the performance of upgrade processes across node clusters in HCI environments.

12 Claims, 5 Drawing Sheets

(56) References Cited

U.S. PATENT DOCUMENTS

2020/0201665 A1\* 6/2020 Panse ................... G06F 9/5077
2020/0251360 A1\* 8/2020 Liao ...................... G06N 3/084
2020/0319874 A1\* 10/2020 Hoprich ................ G06N 20/00

\* cited by examiner

METHOD AND SYSTEM FOR PREDICTING UPGRADE COMPLETION TIMES IN HYPER-CONVERGED INFRASTRUCTURE ENVIRONMENTS

BACKGROUND

Hyper-converged infrastructure architecture has been widely adopted in the information technology space. Further, due in part to the complexity of the architecture, upgrades targeting the various components of the architecture tend to span extensive lengths of time, which often inconvenience implementers and users of the architecture.

SUMMARY

In general, in one aspect, the invention relates to a method for predicting upgrade completion times. The method includes receiving, for a node cluster, a first cluster information package including a cluster indicator set, processing the cluster indicator set to obtain a projected upgrade time for completing an upgrade process on the node cluster, and providing the projected upgrade time to a manager of the node cluster, to be used in a control of the upgrade process by the manager.

In general, in one aspect, the invention relates to a non-transitory computer readable medium (CRM). The non-transitory CRM includes computer readable program code, which when executed by a computer processor, enables the computer processor to receive, for a node cluster, a first cluster information package including a cluster indicator set, process the cluster indicator set to obtain a projected upgrade time for completing an upgrade process on the node cluster, and provide the projected upgrade time to a manager of the node cluster, to be used in a control of the upgrade process by the manager.

In general, in one aspect, the invention relates to a system. The system includes a plurality of node clusters, a manager of the plurality of node clusters including a first computer processor operatively connected to the plurality of node clusters, and a service including a second computer processor operatively connected to the plurality of node clusters and the manager of the plurality of node clusters, wherein the service is configured to receive, for a node cluster of the plurality of node clusters, a cluster information package including a cluster indicator set, process the cluster indicator set to obtain a projected upgrade time for completing an upgrade process on the node cluster, and provide the projected upgrade time to the manager of the plurality of node clusters, to be used in a control of the upgrade process by the manager of the plurality of node clusters.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for predicting upgrade completion times in hyper-converged infrastructure (HCI) environments. Specifically, one or more embodiments of the invention entails applying machine learning to forecast these upgrade completion times based on select static and dynamic indicators deduced to significantly impact the performance of upgrade processes across node clusters in HCI environments.

Figure 1:
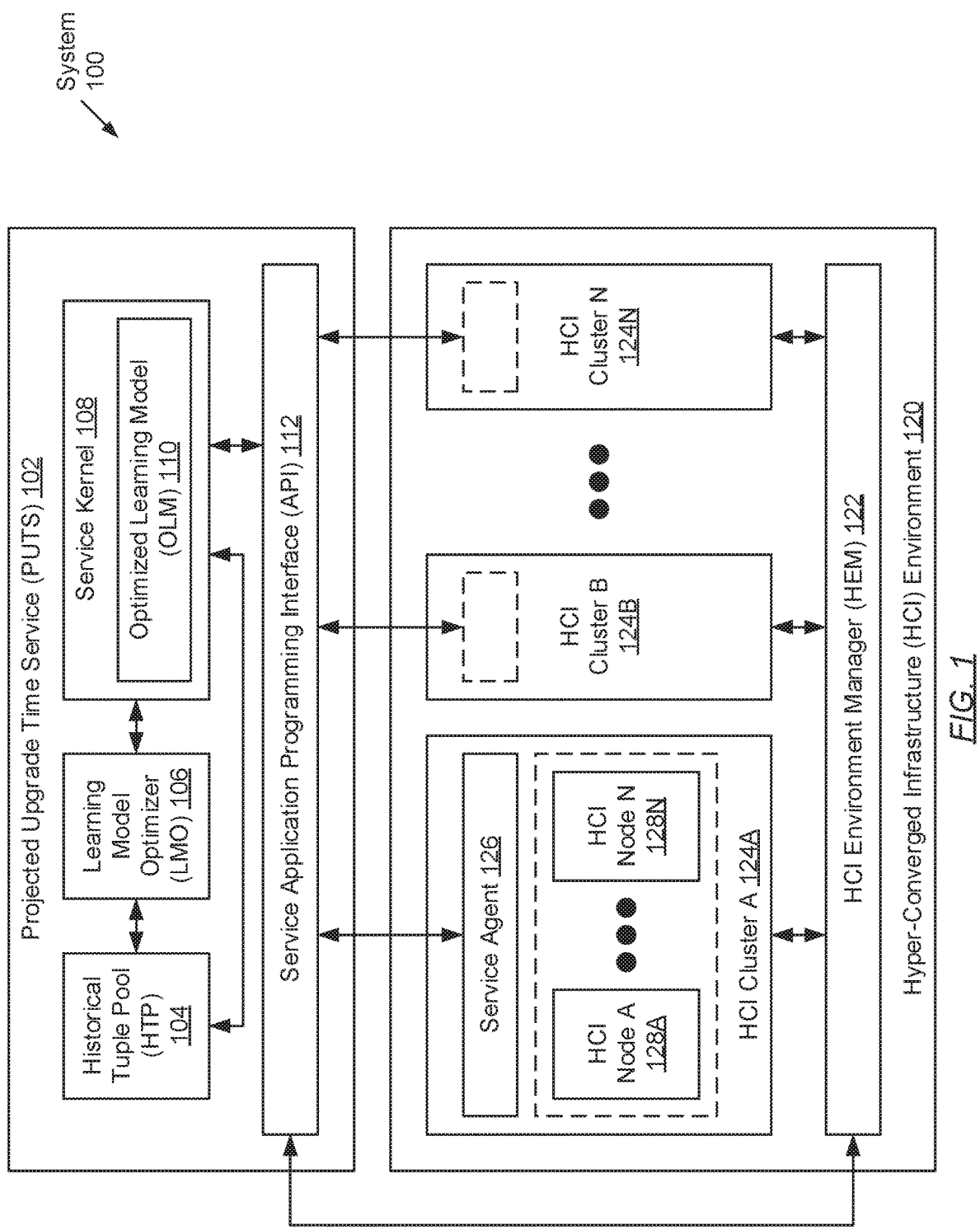
FIG. 1 shows a system in accordance with one or more embodiments of the invention.

FIG. 1 shows a system in accordance with one or more embodiments of the invention. The system (100) may include a projected upgrade time service (PUTS) (102) operatively connected to a hyper-converged infrastructure (HCI) environment (120). Each of these system (100) components is described below.

In one embodiment of the invention, the above-mentioned system (100) components may operatively connect to one another through a network (not shown)(e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled components (or switches)(e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the PUTS (102) may represent an operations support service for datacenter and/or cloud computing environments. Specifically, the PUTS (102) may be designed and configured to employ machine learning and/or artificial intelligence techniques directed to predicting upgrade times, relevant to the installation of software and/or firmware upgrades, on HCI clusters (described below). To that extent, the PUTS (102) may include functionality to produce optimized learning models (see e.g., FIG. 2) and process cluster information packages (see e.g., FIG. 3) in accordance with one or more embodiments of the invention. One of ordinary skill will appreciate that the PUTS (102) may perform other functionalities without departing from the scope of the invention.

In one embodiment of the invention, a software and/or firmware upgrade may refer to significant and substantial changes to various components, features, and/or services that collectively support the functionality of a HCI cluster. Upgrades may often entail large, complex installations, which may provide patches or fixes to existing software and/or firmware, as well as introduce and implement new features and/or services. Further, upgrades tend to disseminate new version releases of any and often numerous computer programs, background processes, utilities, device drivers, etc., which may be installed on any given HCI cluster.

In one embodiment of the invention, the PUTS (102) may be implemented using one or more servers (not shown). Each server may be a physical server, which may reside in a datacenter, or a virtual server, which may reside in a cloud computing environment. Additionally or alternatively, the PUTS (102) may be implemented using one or more computing systems similar to the exemplary computing system shown in FIG. 5. Furthermore, the PUTS (102) may include a historical tuple pool (HTP) (104), a learning model optimizer (LMO) (106), a service kernel (108), and a service application programming interface (API)(112). Each of these PUTS (102) subcomponents is described below.

In one embodiment of the invention, the HTP (104) may refer to a data repository dedicated to storing historical (or previously received and processed) tuples. Each historical tuple may refer to a finite ordered list (or sequence) of elements, which at least encompasses a set of upgrade time relevant indicators and an actual upgrade time captured for a previously completed upgrade process instantiated on a HCI cluster (described below). The aforementioned set of indicators, associated with a given HCI cluster, may refer to a collection of static and dynamic factors that may substantively influence the length of time necessary or required to complete a given upgrade on the given HCI cluster. The aforementioned actual upgrade time, on the other hand, may refer to the observed and measured span of time, expressed in any prescribed time unit (e.g., hours), which had elapsed to complete the given upgrade on the given HCI cluster. Together, the set of indicators and the actual upgrade time, relevant to a given upgrade performed on a given HCI cluster, may be maintained as a learning model training set and/or validation set used in optimizing the learning model through supervised learning.

In one embodiment of the invention, a static indicator may refer to an upgrade time relevant factor that remains constant (i.e., unchanging) throughout the runtime of a given upgrade process on a given HCI cluster. Examples of a static indicator may include, but are not limited to, a cluster node count, an upgrading cluster component count, and an upgrade bundle component size. The cluster node count may be expressed as a numerical value and may refer to the number of HCI nodes (described below) in or forming the given HCI cluster. On the other hand, the upgrading cluster component count may be expressed as a numerical value and may refer to the number of different components, features, services, etc., (both existing and new) of the given HCI cluster, that which the software and/or firmware upgrade (also referred to as an upgrade bundle) targets. Further, the upgrade bundle component size may be expressed as a numerical value and may refer to an average data size (e.g., bytes, kilobytes, megabytes, etc.) of each upgrade bundle component in or forming the upgrade bundle. An upgrade bundle component may refer to an individual upgrade package or archive that may include any number of files and scripts, which when installed or executed on the given HCI cluster, effects a given upgrade to a given HCI cluster component, feature, service, etc. One of ordinary skill will appreciate that additional or alternative static indicators may be used without departing from the scope of the invention.

In one embodiment of the invention, a dynamic indicator may refer to an upgrade time relevant factor that changes throughout the runtime of a given upgrade process on a given HCI cluster. Examples of a dynamic indicator may include, but are not limited to, a cluster memory usage rate, a cluster disk input-output (IO) rate, a cluster effective network bandwidth, a cluster compute usage rate, and a cluster disk usage rate. The cluster memory usage rate may be expressed as a numerical value and may refer to the average rate of memory (e.g., random access memory (RAM)) consumption or usage, across all HCI nodes of the given HCI cluster, at any given time during the performance of the given upgrade process. The cluster disk IO rate may be expressed as a numerical value and may refer to the average rate of read and/or write operations, across all HCI nodes of the given HCI cluster, direct to disk storage at any given time during the performance of the given upgrade process. Further, the cluster effective network bandwidth may be expressed as a numerical value and may refer to the average effective bandwidth (i.e., rate of network traffic flow), across all HCI nodes of the given HCI cluster, at any given time during the performance of the given upgrade process. The cluster compute usage rate may be expressed as a numerical value and may refer to the average rate of computer processor (e.g., central processing unit (CPU), graphics processing unit (GPU), etc.) capacity is being consumed or used, across all HCI nodes of the given HCI cluster, at any given time during the performance of the given upgrade process. Moreover, the cluster disk usage rate may be expressed as a numerical value and may refer to the average rate of disk storage capacity consumption, across all HCI nodes the given HCI cluster, at any given time during the performance of the given upgrade process. One of ordinary skill will appreciate that additional or alternative dynamic indicators may be used without departing from the scope of the invention.

In one embodiment of the invention, the HTP (104) may be implemented using one or more physical storage devices (not shown). The physical storage device(s) may or may not be of the same type or co-located in a same server, at least in part, implementing the PUTS (102). Further, the historical tuples consolidated in the HTP (104) may be arranged using any storage mechanism (e.g., a filesystem, a database, a collection of tables or records, etc.). Moreover, each physical storage device may include persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, the LMO (106) may refer to a physical device, a computer program executing on a physical device, or a combination thereof, which may be designed and configured to optimize (i.e., train) one or more learning models. A learning model may generally refer to a machine learning algorithm (e.g., a neural network, a decision tree, a support vector machine, a linear or non-linear regression predictor, etc.) that may be used in data classification, data prediction, and other forms of data analysis. By way of an example, the learning model employed to estimate upgrade times, for upgrades instantiated on HCI clusters, may be a locally weighted linear regression (LWLR) model. In brief, the LWLR model may refer to a memory-based or non-parametric, supervised learning algorithm that performs a regression around a point of interest using only training data that are local (or proximal) to that point. Details outlining the structural and behavioral implementation of the LWLR model are outside the scope of embodiments of the invention and, therefore, will not be covered herein.

In one embodiment of the invention, the LMO (106) may include functionality to: retrieve a historical tuple set from the HTP (104); partition the retrieved historical tuple set into a first historical tuple subset (i.e., a learning model training set) and a second historical tuple subset (i.e., a learning model validation set); train a learning model using the learning model training set, thereby deriving one or more optimal learning model parameters; validate the learning model using the learning model validation set, thereby deriving one or more optimal learning model hyper-parameters; and adjusting the learning model, to become an optimized learning model (OLM) (110) (described below), based on the derived optimal learning model parameter(s) and hyper-parameter(s). One of ordinary skill will appreciate that the LMO (106) may perform other functionalities without departing from the scope of the invention.

In one embodiment of the invention, the service kernel (108) may refer to a physical device, a computer program executing on a physical device, or a combination thereof, which may be designed and configured to oversee PUTS (102) operations. To that extent, the service kernel (108) may, for example, manage any and all service resources, mediate requests and responses between service software and/or hardware components, and resolve or handle any and all exceptional service events (e.g., errors, access violations, etc.). The service kernel (108) may also include functionality to invoke or execute an OLM (110) to derive projected upgrade times for given software and/or firmware upgrades, to be performed or performing on one or more HCI clusters, provided captured sets of static and/or dynamic indicators. Summarily, the service kernel (108) may at least perform any subset or all of the flowchart steps shown in FIG. 3. Further, one of ordinary skill will appreciate that the service kernel (108) may perform other functionalities without departing from the scope of the invention.

In one embodiment of the invention, an OLM (110) may refer to a computer program, which may execute on the underlying hardware of the PUTS (102), and may be designed and configured to implement a machine learning and/or artificial intelligence algorithm. The aforementioned algorithm (also referred to as a learning model) may be optimized through supervised learning. Supervised learning may refer to learning (or optimization) through the analysis of training examples and/or data. Further, the OLM (110) may produce a projected upgrade time, for completing a given upgrade process on a given HCI cluster, based on an inputted cluster indicator set—e.g., a superset of static and dynamic upgrade time relevant indicators descriptive of the given HCI cluster and the given upgrade process.

In one embodiment of the invention, the service API (112) may refer to a physical device, a computer program executing on a physical device, or a combination thereof, which may be designed and configured to enable communications between the PUTS (102) and one or more external entities (e.g., one or more components of the HCI environment (120) (described below)). The service API (112) may enable communications through the employment of one or more subroutine definitions, protocols, and/or tools. By way of an example, the service API (112) may be implemented as a web API, which may be accessed through an assigned web address (e.g., a uniform resource locator (URL)) and a WAN (e.g., Internet) connection.

In one embodiment of the invention, the HCI environment (120) may refer to datacenter and/or cloud computing infrastructure—i.e., a configuration of various information technology components (e.g., servers, storage, networking, management, etc.)—that reflects hyper-convergent architecture. Hyper-convergent architecture may entail the software-centric or software-defined integration of virtualization, compute, storage, and networking resources into a single solution. The solution may take form as a software stack, a hardware appliance, or a combination thereof. Further, the HCI environment (120) may include a HCI environment manager (HEM) (122) and one or more HCI clusters (124A-124N). Each of these HCI environment (120) subcomponents is described below.

In one embodiment of the invention, the HEM (122) may refer to a physical appliance or computing system, a computer program executing on a physical appliance or computing system, or a combination thereof. Further, the HEM (122) may be designed and configured to oversee operations and maintenance pertinent to the HCI environment (120). Examples of the HEM (122) may include, but are not limited to, a desktop computer, a workstation computer, a laptop computer, a server, a mainframe, any other computing system similar to the exemplary computing system shown in FIG. 5, a computer program executing on any of the aforementioned exemplary devices, or any combination thereof.

In one embodiment of the invention, the HEM (122) may include functionality to: receive software and/or firmware updates, over the network (not shown), for various components, features, and/or services that collectively support the functionality of the HCI clusters (124A-124N); control (i.e., initiate, abort, re-schedule, etc.) the installation of the updates across the HCI clusters (124A-124N); maintain a status of any given upgrade process transpiring on any given HCI cluster (124A-124N); and receive projected upgrade times, from the PUTS (102), estimating the time to completion of any given upgrade process transpiring on any given HCI cluster (124A-1024N). One of ordinary skill will appreciate that the HEM (122) may perform other functionalities without departing from the scope of the invention.

In one embodiment of the invention, a HCI cluster (124A-124N) may refer to a group of linked computing systems—i.e., HCI nodes (128A-128N) (described below)—which may be configured to share resources. The shared resources may include at least compute, storage, and/or network resources. Further, the sharing of a given resource may entail virtualizing the given resource in each linked computing system to create a logical pool of the given resource. From the logical pool of a given resource, consumable units of the given resource may subsequently be provisioned, as needed, across all linked computing systems forming the HCI cluster (124A-124N). Moreover, the group of linked computing systems may collectively work towards servicing a specific usage scenario—e.g., large-scale and complex data processing, data deduplication and storage, etc. A HCI cluster (124A-124N) may often be designed and configured to sustain high availability and/or redundancy.

In one embodiment of the invention, a service agent (126) may refer to a computer program, which may execute on the underlying hardware of a given HCI cluster (124A-124N). Specifically, the service agent (126) may execute on any subset or all of the linked computing systems forming the given HCI cluster (124A-124N). Further, a service agent (126) may be designed and configured to issue cluster information packages to the PUTS (102). That that extent, the service agent (126) may include functionality to at least perform the various steps outlined below with respect to FIG. 4.

In one embodiment of the invention, a HCI node (128A-128N) may refer to a physical appliance or computing system designed and configured to share resources with one or more other HCI nodes (128A-128N) forming a given HCI cluster (124A-124N). Further, a HCI node (128A-128N) may manage a set of tasks that implement at least a portion of the specific usage scenario that which the given HCI cluster (124A-124N) may be servicing. Examples of a HCI node (128A-128N) may include, but are not limited to, a desktop computer, a workstation computer, a server, a mainframe, or any other computing system similar to the exemplary computing system shown in FIG. 5.

While FIG. 1 shows a configuration of components, other system (100) configurations may be used without departing from the scope of the invention.

Figure 2:
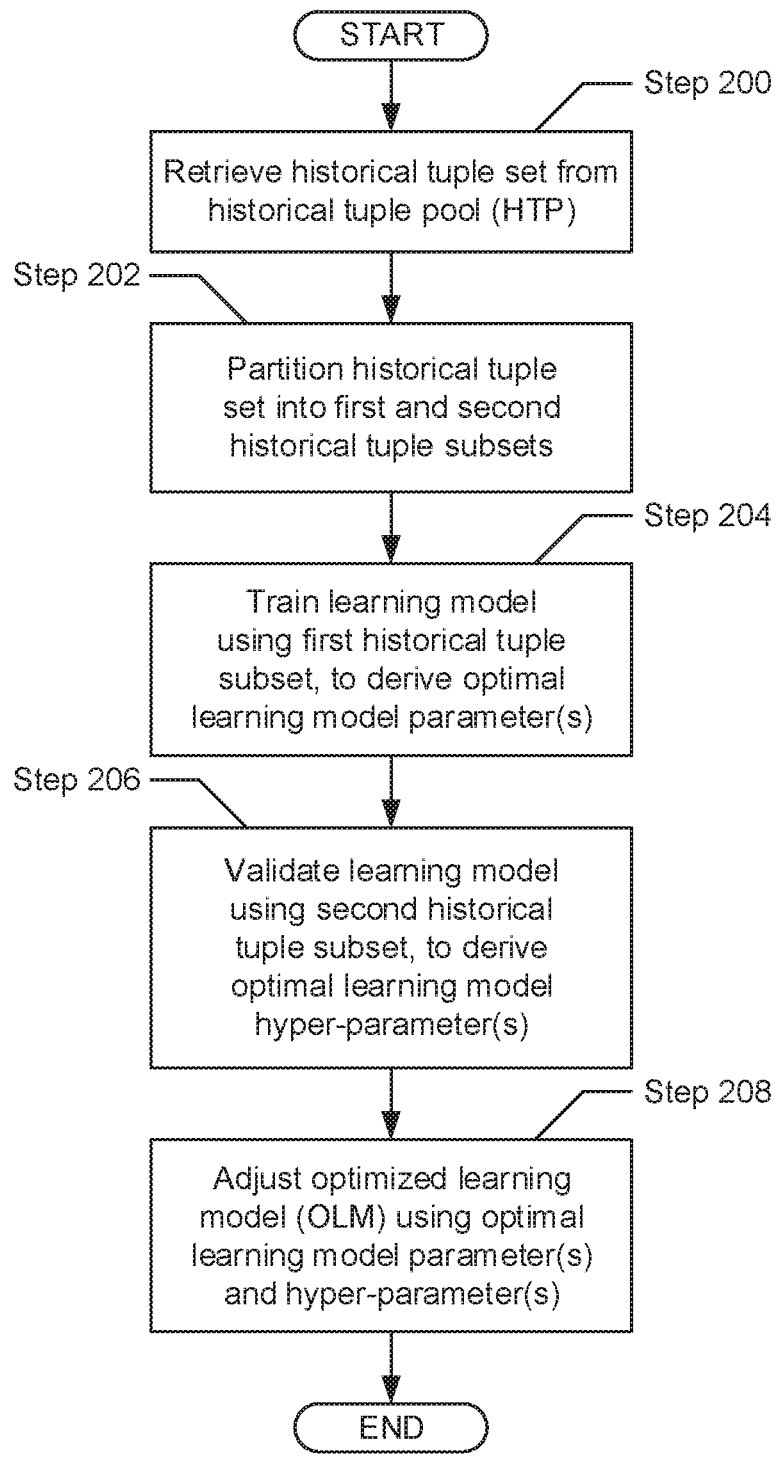
FIG. 2 shows a flowchart describing a method for obtaining an optimized learning model in accordance with one or more embodiments of the invention.

FIG. 2 shows a flowchart describing a method for obtaining an optimized learning model in accordance with one or more embodiments of the invention. The various steps outlined below may be performed by the projected upgrade time service (PUTS) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a historical tuple set is retrieved from a historical tuple pool (HTP). In one embodiment of the invention, the historical tuple set may encompass a collection of historical tuples. Further, each historical tuple may refer to a finite ordered list (or sequence) of elements, which at least includes a set of upgrade time relevant indicators and an actual upgrade time captured for a previously completed upgrade process instantiated on a hyper-converged infrastructure (HCI) cluster.

In Step 202, the historical tuple set (retrieved in Step 200) is partitioned into two historical tuple subsets. In one embodiment of the invention, a first historical tuple subset may include a first portion of a cardinality (or number) of historical tuples in the historical tuple set, whereas a second historical tuple subset may include a second portion (or remainder) of the cardinality of historical tuples in the historical tuple set. Further, the first historical tuple subset may also be referred herein as a learning model training set, while the second historical tuple subset may also be referred herein as a learning model validation set.

In one embodiment of the invention, the ratio of historical tuples forming the first historical tuple subset to historical tuples forming the second historical tuple subset may be determined based on datacenter and/or cloud computing administrator preferences. Specifically, the aforementioned preferences may include a parameter—e.g., a percentage of data for training (PDT) parameter—expressed through a numerical value that specifies the percentage of the historical tuple set should be used for optimizing learning model parameters (described below).

In Step 204, a learning model is trained using the first historical tuple subset (i.e., the learning model training set) (obtained in Step 202). In one embodiment of the invention, training the learning model may result in the derivation of one or more optimal learning model parameters. A learning model parameter may refer to a learning model configuration variable that may be adjusted (or optimized) during a training runtime of the respective learning model. By way of an example, a learning model parameter, pertinent to a locally weighted linear regression (LWLR) model, may include the set of non-negative weights associated with a given set of training points (i.e., the learning model training set). Further, the derivation of the optimal learning model parameter(s) may be possible through supervised learning, which refers to learning (or optimization) through the analyses of training examples and/or data.

In Step 206, the learning model (trained in Step 204) is validated using the second historical tuple subset (i.e., the learning model validation set) (obtained in Step 202). In one embodiment of the invention, validating the learning model may result in the derivation of one or more optimal learning model hyper-parameters. A learning model hyper-parameter may refer to a learning model configuration variable that may be adjusted (or optimized) outside or before the training runtime of the respective learning model. That is, a learning model hyper-parameter may represent a variable directed to the architecture design of the respective learning model. By way of examples, learning model hyper-parameters, pertinent to a LWLR model, may include the weight function used to derive the above-mentioned set of non-negative weights (e.g., a bell-shaped weight function, which relies on another hyper-parameter—i.e., a bandwidth parameter that controls the rate at which each non-negative weight falls with distance from a desired query point), a number of iterations defining the length of the training runtime of the learning model, etc.

In Step 208, an optimized learning model (OLM) is defined using the optimal learning model parameter(s) (derived in Step 204) and the optimal learning model hyper-parameter(s) (derived in Step 206). In one embodiment of the invention, the OLM may represent a tuned learning model inferred from example input-output pairs (e.g., the learning model training set), which may exhibit acceptable prediction performance and accuracy.

Figure 3:
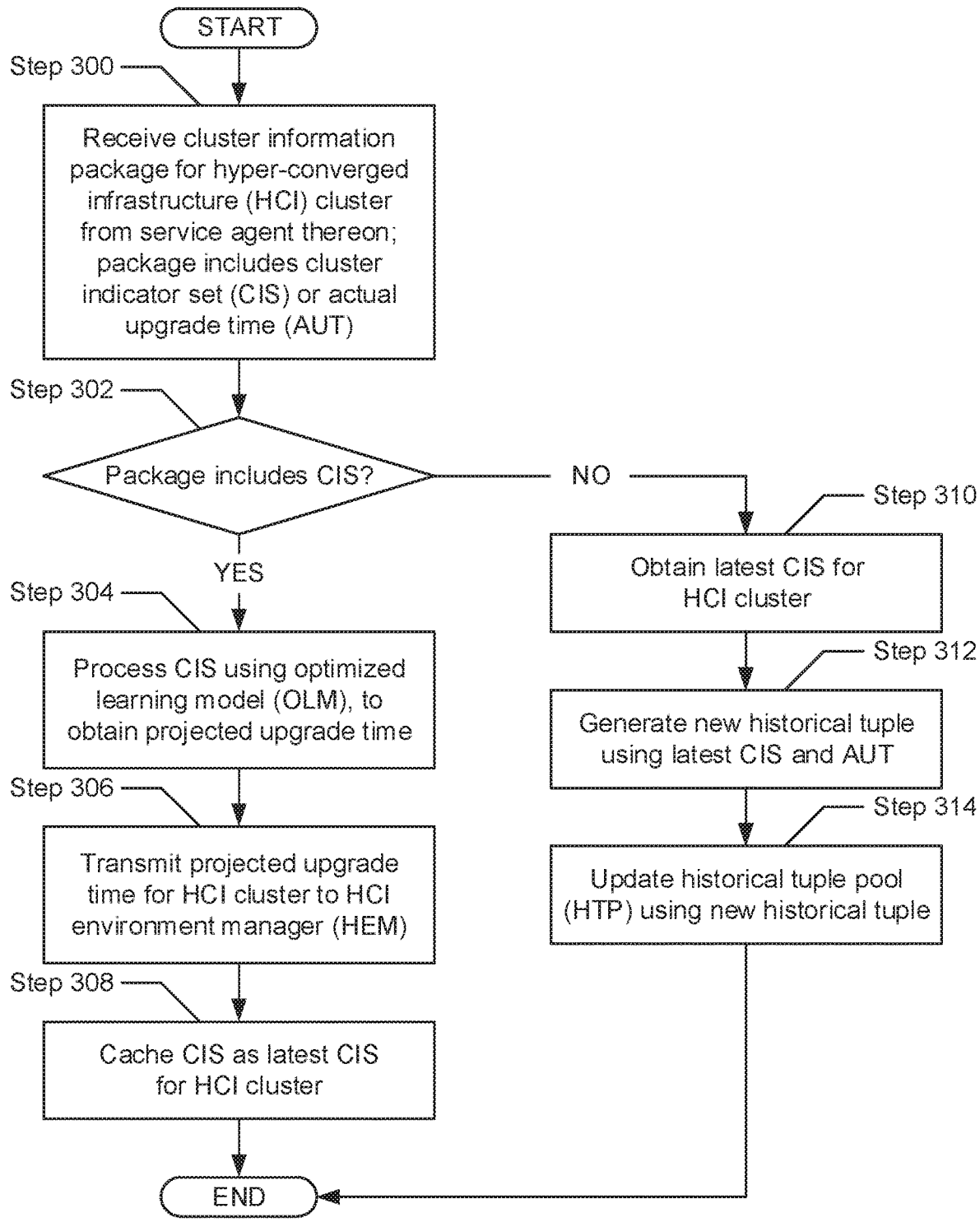
FIG. 3 shows a flowchart describing a method for processing a cluster information package in accordance with one or more embodiments of the invention.

FIG. 3 shows a flowchart describing a method for processing a cluster information package in accordance with one or more embodiments of the invention. The various steps outlined below may be performed by the projected upgrade time service (PUTS) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a cluster information package is received. In one embodiment of the invention, the cluster information package may refer to a data container (i.e., a file-format) in which a cluster indicator set or an actual upgrade time, for a given hyper-converged infrastructure (HCI) cluster (described above—see e.g., FIG. 1), may be stored and delivered. Further, the cluster information package may have been received, over a network, from a service agent residing and executing on the given HCI cluster.

In one embodiment of the invention, a cluster indicator set may refer to a collection of upgrade time relevant indicators captured during the execution of an active upgrade process transpiring on the above-mentioned given HCI cluster. More specifically, these upgrade time relevant indicators may encompass static and dynamic factors that may substantively influence the length of time necessary or required to complete the aforementioned active upgrade process transpiring on the given HCI cluster. Descriptions and examples pertaining to these static and dynamic factors (or indicators) are detailed above (see e.g., FIG. 1). An actual upgrade time, on the other hand, may refer to an observed and measured span of time, expressed in any prescribed time unit (e.g., hours), which reflects the elapsed completion time of the active upgrade process that had been transpiring on the given HCI cluster.

In Step 302, a determination is made as to whether the cluster information package (received in Step 300) includes a cluster indicator set. The determination may entail examining the contents of the cluster information package, examining metadata (e.g., a content size, a content name, etc.) describing the contents of the cluster information package, or a combination thereof. In one embodiment of the invention, if it is determined that the contents of the cluster information package is a cluster indicator set, then the process may proceed to Step 304. On the other hand, in another embodiment of the invention, if it is alternatively determined that the contents of the cluster information package is an actual upgrade time, then the process may alternatively proceed to Step 310.

In Step 304, after determining (in Step 302) that the cluster information package (received in Step 300) includes a cluster indicator set, the cluster indicator set is processed using an optimized learning model (OLM) (described above—see e.g., FIGS. 1 and 2). Further, in one embodiment of the invention, processing of the cluster indicator set, using the OLM, may produce a projected upgrade time (or time to completion) for the above-mentioned active upgrade process transpiring on the above-mentioned given HCI cluster.

In Step 306, the projected upgrade time (produced in Step 304) is transmitted to an HCI environment manager (HEM) (described above—see e.g., FIG. 1). Thereafter, in Step 308, the cluster indicator set (received via the cluster information package in Step 300) is cached.

In one embodiment of the invention, the above-mentioned HEM may use the projected upgrade time, for the active upgrade process transpiring on the given HCI cluster, to make a decision on whether to proceed with or abort the active upgrade process. The decision may, for example, entail: (a) obtaining analytics maintained for the given HCI cluster; (b) generating a busy times graph based on the maintained analytics, where the graph may capture an averaging of multiple recorded observations of a specified length of time (e.g., a day) directed to how busy (e.g., in terms of user access to or workloads being processed on) the given HCI cluster has been during different specified intervals (e.g., hours) of the aforementioned specified length of time; (c) deriving a time window based on a start timestamp associated with the active upgrade process and the projected upgrade time, where the time window depicts a period of time encompassing one or more specified intervals of the aforementioned specified length of time during which the active upgrade process is expected to transpire; (d) overlaying the derived time window on top of the generated busy times graph, to identify a subset of the busy times graph that intersects with the derived time window; and (e) determining to permit or terminate the active upgrade process based on the intersecting subset of the busy times graph.

Regarding above-mentioned step (e), the HEM may, more specifically, (i) permit the active upgrade process to proceed on the given HCI cluster if the intersecting subset of the busy times graph portrays a period of time during which the given HCI cluster is substantively idle; or (ii) terminate the active upgrade process transpiring on the given HCI cluster if the intersecting subset of the busy times graph portrays a period of time during which the given HCI cluster is substantively active and/or accessed by users. Further, following the decision to abort the active upgrade process, the HEM may re-schedule the active upgrade process to overlap another period of time, shown by the busy times graph, reflecting a substantial inactivity on the given HCI cluster. Embodiments of the invention are not limited to this exemplary behavior of the HEM provided the receipt of a projected upgrade time for a given upgrade process on a given HCI cluster.

In Step 310, after alternatively determining (in Step 302) that the cluster information package (received in Step 300) includes an actual upgrade time, a cluster indicator set to which the actual upgrade time maps and had been cached earlier (see e.g., Step 308), is obtained. That is, in one embodiment of the invention, the cluster indicator set, corresponding to the actual upgrade time, may be retrieved from cache memory.

In Step 312, a new historical tuple is generated. In one embodiment of the invention, the new historical tuple may refer to a finite ordered list (or sequence) of elements. The elements may include, but are not limited to, the cluster indicator set (obtained in Step 310) and the actual upgrade time (received via the cluster information package in Step 300). Further, the new historical tuple may subsequently serve as a learning model training sample and/or validation sample used in future optimizations of the learning model through supervised learning. Hereinafter, in Step 314, a historical tuple pool (HTP), residing on the PUTS, may be updated to include the new historical tuple (generated in Step 312).

Figure 4:
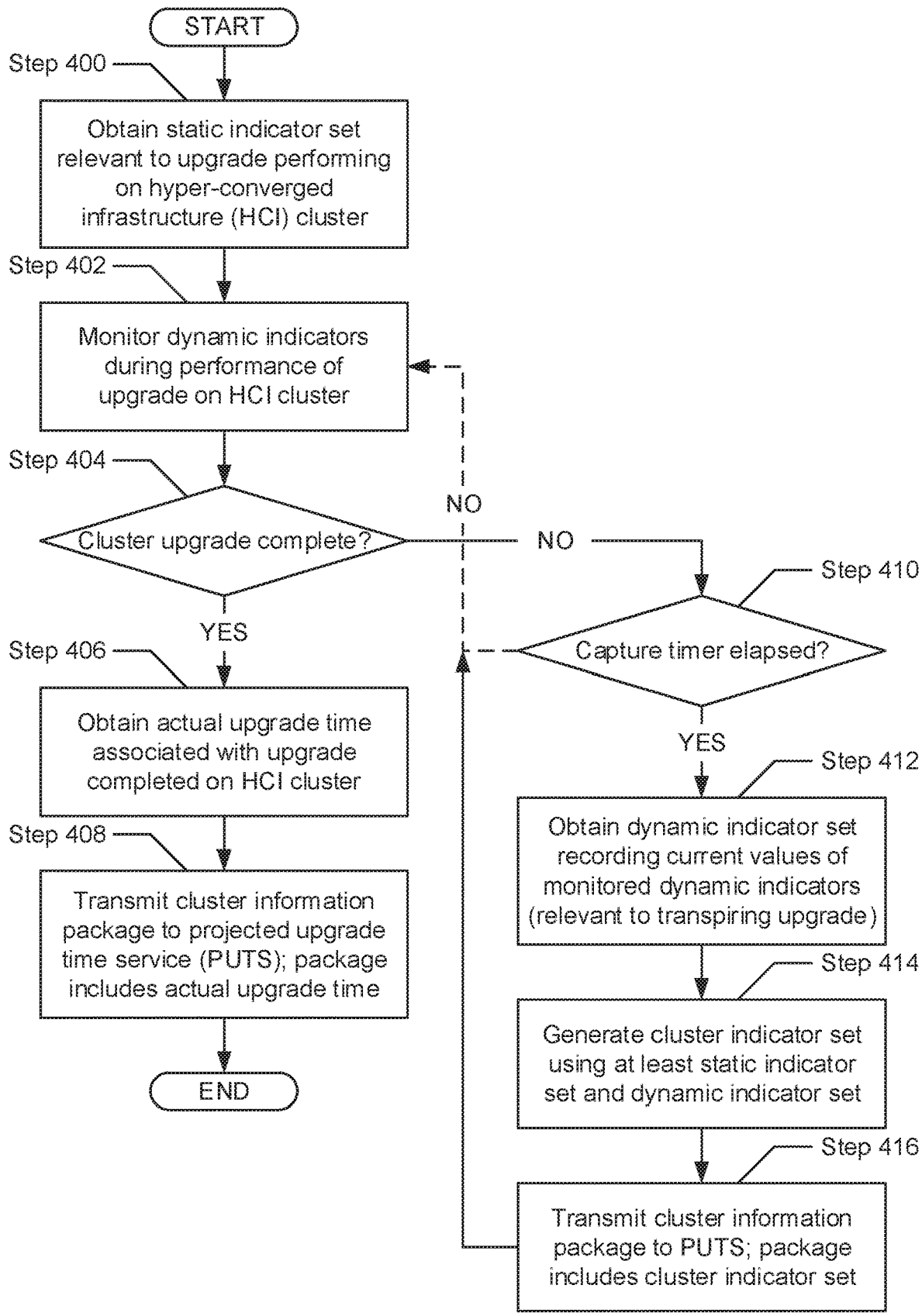
FIG. 4 shows a flowchart describing a method for transmitting cluster information packages in accordance with one or more embodiments of the invention.

FIG. 4 shows a flowchart describing a method for transmitting cluster information packages in accordance with one or more embodiments of the invention. The various steps outlined below may be performed by any service agent executing on a respective hyper-converged infrastructure (HCI) cluster (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a static indicator set is obtained. In one embodiment of the invention, the static indicator set may refer to a collection of established values representative of a set of static indicators, or upgrade time relevant factors that remain constant (i.e., unchanging) throughout the runtime of a given upgrade process, which may be transpiring on a given HCI cluster. Examples of these static indicators are provided above with respect to FIG. 1.

In Step 402, while the above-mentioned given upgrade process is transpiring on the given HCI cluster, one or more dynamic indicators is/are monitored. In one embodiment of the invention, a dynamic indicator may refer to an upgrade time relevant factor that changes throughout the runtime of the given upgrade process transpiring on the given HCI cluster. Examples of these dynamic indicators are provided above with respect to FIG. 1.

In Step 404, a determination is made as to whether the given upgrade process, transpiring on the given HCI cluster, is complete. The determination may entail querying a HCI environment manager (HEM) (described above—see e.g., FIG. 1) as to the status of the given upgrade process. Accordingly, in one embodiment of the invention, if it is determined that the given upgrade process is complete, then the process may proceed to Step 406. On the other hand, in another embodiment of the invention, if it is alternatively determined that the given upgrade process is incomplete, then the process may alternatively proceed to Step 410.

In Step 406, after determining (in Step 404) that the given upgrade process—transpiring on the given HCI cluster—is complete, an actual upgrade time is obtained. In one embodiment of the invention, the actual upgrade time may refer to an observed and measured span of time, expressed in any prescribed time unit (e.g., hours), which reflects the elapsed completion time of the completed given upgrade process that had been transpiring on the given HCI cluster.

In Step 408, a cluster information package is transmitted to a projected upgrade time service (PUTS) (described above—see e.g., FIG. 1). In one embodiment of the invention, the cluster information package may refer to a data container (i.e., a file-format) in which information may be stored and delivered to the PUTS. Further, the information included in the cluster information package may include the actual upgrade time (obtained in Step 406).

In Step 410, after alternatively determining (in Step 404) that the given upgrade process—transpiring on the given HCI cluster—is incomplete, a determination is made as to whether a capture timer has elapsed. In one embodiment of the invention, the capture timer may refer to a physical or virtual clock that may be used to track the decrease or decrement of time from a specified time value (e.g., a span of time defined by a sampling interval for the periodic collection and deliverance of upgrade time relevant indicators). Accordingly, in one embodiment of the invention, if it is determined that the capture timer has elapsed (i.e., currently stores a zero value), then the process may proceed to Step 412. On the other hand, in another embodiment of the invention, if it is alternatively determined that the capture timer has not elapsed (i.e., currently stores a non-zero value), then the process may alternatively proceed to Step 402, where the monitoring of the dynamic indicators continues while the given upgrade process remains underway.

In Step 412, after determining (in Step 410) that the above-mentioned capture timer has elapsed, a dynamic indicator set is obtained. In one embodiment of the invention, the dynamic indicator set may refer to a collection of current values representative of the dynamic indicators (monitored in Step 402).

In Step 414, a cluster indicator set is generated. In one embodiment of the invention, the cluster indicator set may refer to a collection of values representative of a superset of upgrade time relevant factors. Accordingly, the cluster indicator set may at least include the static indicator set (obtained in Step 400) and the dynamic indicator set (obtained in Step 412).

In Step 416, a cluster information package is transmitted to the PUTS. In one embodiment of the invention, the cluster information package may refer to a data container (i.e., a file-format) in which information may be stored and delivered to the PUTS. Further, the information included in the cluster information package may include the cluster indicator set (generated in Step 414). Hereinafter, following a reset of the above-mentioned capture timer, the process may proceed to Step 402, where the monitoring of the dynamic indicators continues while the given upgrade process remains underway.

Figure 5:
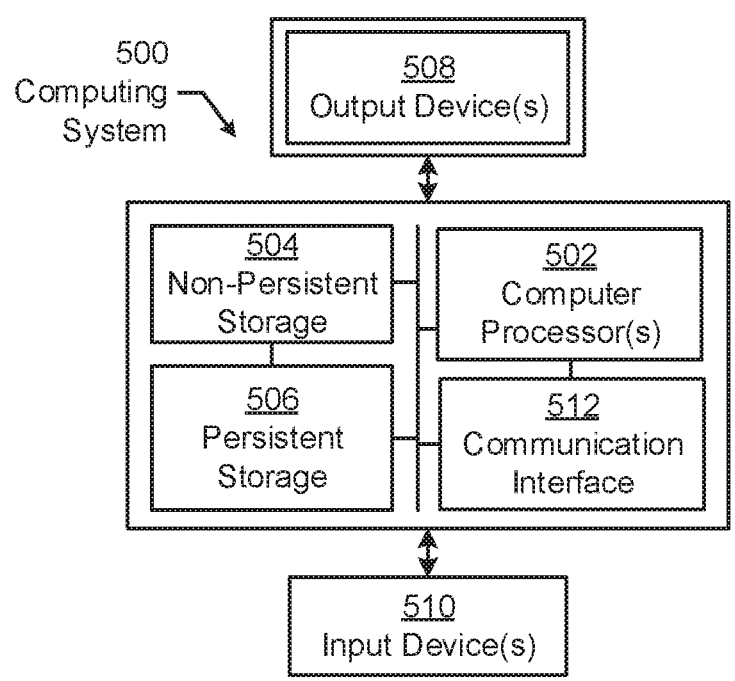
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506)(e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s)(502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for predicting upgrade completion times, comprising:
    receiving, for a node cluster, a first cluster information package;
    determining that the first cluster information package comprises a cluster indicator set, wherein the cluster indicator set comprises a set of static indicators and a set of dynamic indicators pertinent to predicting upgrade completion times;
    processing the cluster indicator set to obtain a projected upgrade time for completing an upgrade process on the node cluster,
    wherein processing the cluster indicator set comprises:
        using a locally weighted linear regression machine learning algorithm in combination with a historical tuple pool and a parameter specifying a percentage of the historical tuple pool used in the locally weighted linear regression machine learning algorithm, wherein each historical tuple of the historical tuple pool is a finite ordered sequence of elements comprising:
            a previously obtained cluster indicator set,
            a set of upgrade time relevant indicators, and
            a completed upgrade time associated with the previously obtained cluster indicator set; and
    providing the projected upgrade time to a manager of the node cluster, to be used in a control of the upgrade process by the manager,
    wherein the node cluster is a hyper-converged infrastructure (HCI) cluster comprising a plurality of linked HCI nodes.

2. The method of claim 1, wherein the set of static indicators comprises a cluster node count, an upgrading cluster component count, and an upgrade bundle component size.

3. The method of claim 1, wherein the set of dynamic indicators comprises a cluster memory usage rate, a cluster disk input-output (IO) rate, a cluster effective network bandwidth, a cluster compute usage rate, and a cluster disk usage rate.

4. The method of claim 1, further comprising:
    receiving, for the node cluster, a second cluster information package; determining that the second cluster information package comprises an actual upgrade time;
    generating a new historical tuple using the cluster indicator set and the actual upgrade time; and
    updating the historical tuple pool using the new historical tuple.

5. The method of claim 1, wherein the projected upgrade time overlaps a period of time during which the node cluster is busy and is frequently accessed by users, wherein controlling the upgrade process, by the manager, comprises aborting and re-scheduling the upgrade process.

6. The method of claim 1, wherein the projected upgrade time overlaps a period of time during which the node cluster is idle and is infrequently accessed by users, wherein controlling the upgrade process, by the manager, comprises permitting the upgrade process to proceed.

7. A non-transitory computer readable medium (CRM) comprising computer readable program code, which when executed by a computer processor, enables the computer processor to:
    receive, for a node cluster, a first cluster information package;
    determining that the first cluster information package comprises a cluster indicator set, wherein the cluster indicator set comprises a set of static indicators and a set of dynamic indicators pertinent to predicting upgrade completion times;
    process the cluster indicator set to obtain a projected upgrade time for completing an upgrade process on the node cluster,
    wherein processing the cluster indicator set comprises:
        using a locally weighted linear regression machine learning algorithm in combination with a historical tuple pool and a parameter specifying a percentage of the historical tuple pool used in the locally weighted linear regression machine learning algorithm, wherein each historical tuple of the historical tuple pool is a finite ordered sequence of elements comprising:
            a previously obtained cluster indicator set,
            a set of upgrade time relevant indicators, and
            a completed upgrade time associated with the previously obtained cluster indicator set; and
    provide the projected upgrade time to a manager of the node cluster, to be used in a control of the upgrade process by the manager, wherein the node cluster is a hyper-converged infrastructure (HCI) cluster comprising a plurality of linked HCI nodes.

8. The non-transitory CRM of claim 7, wherein the set of static indicators comprises a cluster node count, an upgrading cluster component count, and an upgrade bundle component size.

9. The non-transitory CRM of claim 7, wherein the set of dynamic indicators comprises a cluster memory usage rate, a cluster disk input-output (IO) rate, a cluster effective network bandwidth, a cluster compute usage rate, and a cluster disk usage rate.

10. The non-transitory CRM of claim 7, comprising computer readable program code, which when executed by the computer processor, further enables the computer processor to:
    receive, for the node cluster, a second cluster information package;
    determining that the second cluster information package comprises an actual upgrade time;
    generate a new historical tuple using the cluster indicator set and the actual upgrade time; and
    update the historical tuple pool using the new historical tuple.

11. The non-transitory CRM of claim 7, wherein the projected upgrade time overlaps a period of time during which the node cluster is busy and is frequently accessed by users, wherein controlling the upgrade process, by the manager, comprises aborting and re-scheduling the upgrade process.

12. A system, comprising:
    a plurality of node clusters, wherein each node cluster is a hyper-converged infrastructure (HCI) cluster comprising a plurality of linked HCI nodes;
    a manager of the plurality of node clusters comprising a first computer processor operatively connected to the plurality of node clusters; and
    a service comprising a second computer processor operatively connected to the plurality of node clusters and the manager of the plurality of node clusters,
    wherein the service is configured to:

receive, for a node cluster of the plurality of node clusters, a cluster information package;

determining that the cluster information package comprises a cluster indicator set, wherein the cluster indicator set comprises a set of static indicators and a set of dynamic indicators pertinent to predicting upgrade completion times;

process the cluster indicator set to obtain a projected upgrade time for completing an upgrade process on the node cluster, wherein processing the cluster indicator set comprises:
   using a locally weighted linear regression machine learning algorithm in combination with a historical tuple pool and a parameter specifying a percentage of the historical tuple pool used in the locally weighted linear regression machine learning algorithm, wherein each historical tuple of the historical tuple pool is a finite ordered sequence of elements comprising:
     a previously obtained cluster indicator set,
     a set of upgrade time relevant indicators, and
     a completed upgrade time associated with the previously obtained cluster indicator set; and provide the projected upgrade time to the manager of the plurality of node clusters, to be used in a control of the upgrade process by the manager of the plurality of node clusters.

* * * * *